(12) United States Patent
Franiak et al.

(10) Patent No.: US 9,896,013 B2
(45) Date of Patent: Feb. 20, 2018

(54) VEHICLE AUTOMATIC HOIST SYSTEM AND METHOD

(71) Applicant: Wastequip LLC, Charlotte, NC (US)

(72) Inventors: Nicholas S. Franiak, Francesville, IN (US); John J. Downing, Winamac, IN (US)

(73) Assignee: Wastequip LLC, Charlotte, NC (US)

( * ) Notice: Subject to any disclaimer, the term of this patent is extended or adjusted under 35 U.S.C. 154(b) by 0 days.

(21) Appl. No.: 15/166,385

(22) Filed: May 27, 2016

(65) Prior Publication Data

US 2016/0347228 A1 Dec. 1, 2016

Related U.S. Application Data

(60) Provisional application No. 62/168,154, filed on May 29, 2015.

(51) Int. Cl.
*B60P 1/00* (2006.01)
*B60P 1/48* (2006.01)
*B60P 1/64* (2006.01)

(52) U.S. Cl.
CPC ............. *B60P 1/483* (2013.01); *B60P 1/00* (2013.01); *B60P 1/6454* (2013.01)

(58) Field of Classification Search
CPC ........................................................ B60P 1/00
See application file for complete search history.

(56) References Cited

U.S. PATENT DOCUMENTS

| 4,839,835 | A | * | 6/1989 | Hagenbuch | G08G 1/20 |
| | | | | | 177/136 |
| 5,088,875 | A | | 2/1992 | Galbreath et al. | |
| 5,639,139 | A | * | 6/1997 | Rush | B60P 3/025 |
| | | | | | 280/763.1 |
| 6,416,033 | B1 | | 7/2002 | McKell et al. | |
| 6,439,668 | B1 | | 8/2002 | Hagenbuch et al. | |
| 6,648,576 | B1 | | 11/2003 | Duell et al. | |
| 7,293,607 | B2 | | 11/2007 | Lambert et al. | |
| 8,297,904 | B1 | | 10/2012 | Schroeder | |
| 9,004,842 | B2 | | 4/2015 | Downing et al. | |
| 2006/0285952 | A1 | | 12/2006 | Galbreath et al. | |
| 2009/0025378 | A1 | | 1/2009 | Laumer et al. | |
| 2014/0288675 | A1 | * | 9/2014 | Fujiwara | G06F 11/0748 |
| | | | | | 700/79 |

* cited by examiner

*Primary Examiner* — Yonel Beaulieu
(74) *Attorney, Agent, or Firm* — Nelson Mullins Riley & Scarborough LLP

(57) ABSTRACT

Systems and methods for controlling a hoist apparatus on a vehicle to automatically load and unload a container. The vehicle includes a chassis, a hoist apparatus coupled with the chassis, and at least one lift mechanism operative to move the hoist apparatus with respect to the chassis in response to the flow of hydraulic fluid along a fluid flow path. The vehicle also includes at least one valve in fluid communication with the at least one lift mechanism, a control system in electronic communication with the at least one valve, and a transceiver in electronic communication with the control system. The control system is operative to receive, via the transceiver, an initiation signal from a remote control unit. Further, the control system is operative to selectively actuate the at least one valve in response to the initiation signal to move the hoist apparatus.

20 Claims, 8 Drawing Sheets

VEHICLE AUTOMATIC HOIST SYSTEM AND METHOD

PRIORITY CLAIM

This application claims the benefit of U.S. Provisional Application Ser. No. 62/168,154, filed May 29, 2015, entitled "Vehicle Automatic Hoist System." The foregoing application is hereby relied upon and incorporated herein by reference for all purposes.

FIELD OF THE INVENTION

Embodiments of the present invention relate to vehicles for transporting containers, such as containers for solid and liquid waste products. In particular, embodiments of the invention relate to systems and methods for controlling a hoist apparatus on such a vehicle to automatically load and unload a container.

BACKGROUND

Many vehicles include a hoist apparatus for loading containers or other items onto the vehicle and for unloading the containers or other items therefrom. In particular, one such vehicle is known as a container handler or loaded container handler. Container handlers typically comprise a hoist apparatus carried on a wheeled chassis that is actuated by pressurized fluid selectively directed by manual controls. Conventionally, the hoist apparatus includes forks carried at the distal end of a lifting arm that are pivotable with respect to the lifting arm via a hydraulic cylinder. The lifting arm is usually pivotable or extendable toward and away from the vehicle chassis via one or more additional hydraulic cylinders. When the vehicle is at a stop, the lifting arm or boom and forks are manipulated to engage a container. The container is then elevated through coordinated movement of the lifting arm and forks to position the container on the chassis. Some container handling vehicles may contain a "hopper" over which the container can be positioned to deposit refuse in the hopper.

Another vehicle that includes a hoist apparatus is known as a "roll off" vehicle. Roll off vehicles generally include a vehicle body or trailer that is adapted to receive a container, such as a large refuse container, that is adapted to roll onto and off of the vehicle. Roll off vehicles often include a hoist apparatus including a sub-frame that is mountable to the vehicle body or trailer and a main-frame that is pivotally mounted to the sub-frame that extends along the vehicle body. The main-frame pivots upwardly relative to the sub-frame, again typically via a hydraulic cylinder, to create a ramp onto which a container can roll on or off. Commonly, the hoist apparatus includes a cable winch system for drawing the container up onto the main-frame during the loading of the container and for easing the container off of the main-frame during the unloading of the container. Typically, one or more pulleys or sheaves are utilized in connection with the operation of such cable winch system. Once the container is loaded onto the main-frame of the hoist apparatus, the main-frame may then be lowered, thereby loading the container onto the roll-off vehicle.

As noted above, hydraulic cylinders are typically used to actuate the hoist apparatus on container carriers, roll off vehicles, or other such vehicles. These hydraulic cylinders are typically operated by manual controls, such as levers or joysticks, located in the cab of such vehicles or located on a valve group mounted on the vehicle chassis. The levers are typically each configured as pneumatic control valves, whereby a supply of pressurized air is supplied to the levers and movement of the levers causes pressurized air to be transmitted through tubing to a pneumatic actuator on a hydraulic control valve. Air pressure acting on a mechanical actuator (such as a piston or diaphragm) causes a valve spool in the valve to change position, which in turn allows hydraulic fluid to flow to the hydraulic actuator. The flow of hydraulic fluid causes the hydraulic cylinder to operate, as is well known.

SUMMARY

According to one embodiment, the present invention provides a method of operation for a control system associated with a vehicle, the vehicle comprising a hydraulic system in electronic communication with the control system. The control system performs the steps of receiving an initiation signal from a remote control unit and, in response to the signal, selectively electronically actuating first and second valves in fluid communication with first and second lifting mechanisms along a fluid flow path. The first and second lifting mechanisms are operative to move a hoist apparatus coupled with the vehicle between a first position and a second position in response to movement of hydraulic fluid. The control system also performs the step of controlling the flow of hydraulic fluid along the fluid flow path to move the hoist apparatus from the first position. Further, the control system receives information representative of the movement of the hoist apparatus and, when the hoist apparatus is in the second position, actuates the first and second valves to stop movement of the first and second lifting mechanisms.

According to a further embodiment, the present invention provides a vehicle comprising a chassis, a hoist apparatus coupled with the chassis, and at least one lift mechanism operative to move the hoist apparatus with respect to the chassis in response to the flow of hydraulic fluid along a fluid flow path. The vehicle further comprises at least one valve in fluid communication with the at least one lift mechanism, a control system in electronic communication with the at least one valve, and a transceiver in electronic communication with the control system. The control system is operative to receive, via the transceiver, an initiation signal from a remote control unit. Further, the control system is operative to selectively actuate the at least one valve in response to the initiation signal to move the hoist apparatus from a first position to a second position.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
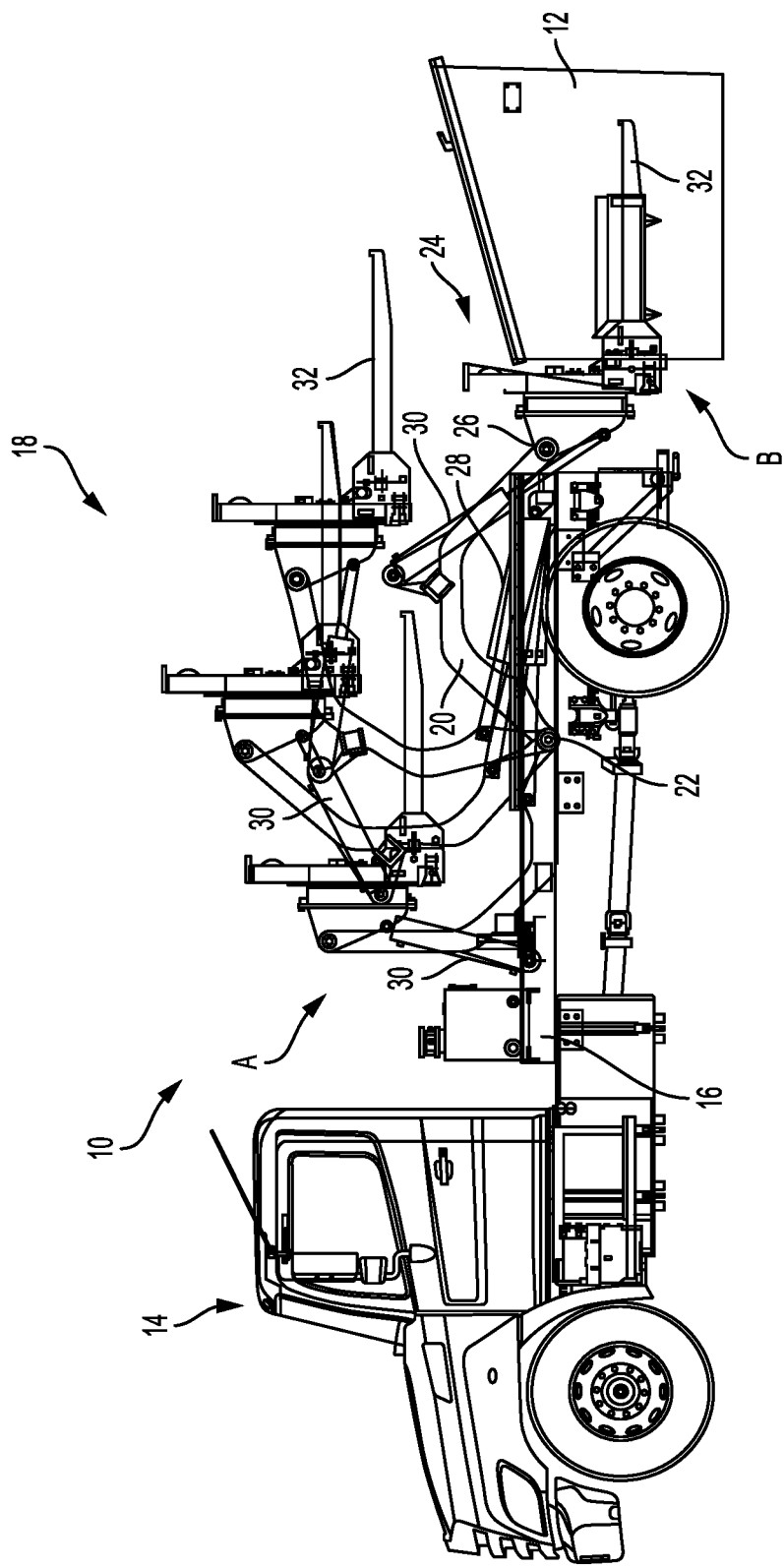
FIG. 1 is a schematic elevation of a vehicle with which an embodiment of the present invention may be utilized.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Currently, hoist apparatuses do not operate automatically to load and unload containers. Further, an operator cannot remotely or wirelessly activate the hoist apparatus to move the container. Rather, the operator must manually adjust controls (such as levers or a joystick) to control movement of the hoist apparatus, and he or she must do so while sitting in a cab of the vehicle or while standing adjacent a valve spool located along the vehicle chassis. Notably, manual operation does not produce smooth, continuous, and precise movement of the hoist apparatus (and a corresponding container) absent a great deal of experience on the part of an operator. For example, where control levers are provided, each lever actuates a single valve associated with a single hydraulic cylinder, and thus manual movement of individual levers tends to yield awkward, choppy, and halting movement of the hoist apparatus and container. Those of skill in the art will appreciate that this can lead to damage to system components, instability of the vehicle and container load, and other unsafe conditions.

Accordingly, embodiments of the invention relate to a system for controlling a hoist apparatus on a vehicle to automatically load and unload a container. A control system electrically actuates the valves that control the flow of hydraulic fluid to and from hydraulic lifts that move the hoist apparatus. When the operator signals an "auto load" or "auto unload" function, the control system may automatically load and unload a container from the vehicle to which the hoist apparatus is coupled. Automatic control of the hoist apparatus provides for smooth, continuous, and precise movement of the container. In addition, in some embodiments, an operator may wirelessly operate the hoist apparatus using a remote control, for example while standing at a distance from the vehicle. These and other aspects of embodiments of the present invention are discussed in more detail below.

Some embodiments of the present invention are particularly suitable for use with certain vehicles, such as loaded container handlers, roll off vehicles, and waste collection and transportation vehicles. However, those of skill in the art will understand that the present invention is not so limited. In fact, it is contemplated that the present invention be used with any appropriate vehicle. Additionally, it is contemplated that the present invention be used with any type of hoist apparatus, including cable hoists, hook hoists, winches, and forklifts, among others, for any type of container.

Referring now to FIG. 1, illustrated is a vehicle 10 with which one embodiment of the present invention may be used. As shown, vehicle 10 is a loaded container handler for transporting and dumping a container 12 and for loading and unloading container 12 from vehicle 10. In one embodiment, vehicle 10 may be analogous to the loaded container handlers offered by Galbreath LLC of Winamac, Ind. In general, vehicle 10 comprises a cab 14, a vehicle body, or chassis, 16, and a hoist apparatus 18. Hoist apparatus 18 generally comprises a lift arm 20 pivotally connected to chassis 16 via a pivotal mount 22 and pivotally connected to a fork assembly 24 via a pivotal mount 26. In FIG. 1, hoist apparatus 18 is illustrated traveling through a range of motion from a first, stowed position A to a second, fully extended position B, wherein fork assembly 24 is in engagement with container 12.

In particular, hoist apparatus 18 comprises two lift mechanisms 28, 30, which are fluid-actuated lift cylinders (e.g., rod-type hydraulic cylinders) in this embodiment. Lift mechanism 28 is pivotally connected between lift arm 20 and chassis 16. When actuated, lift mechanism 28 causes lift arm 20 to move from a stowed position above chassis 16 to an extended position behind vehicle 10. This range of motion typically corresponds to a "lift" function performed by an operator of vehicle 10. Lift mechanism 30 is pivotally connected between lift arm 20 and fork assembly 24. When actuated, lift mechanism 30 causes fork assembly 24 to pivot about pivotal mount 26. This range of motion may correspond to a "tilt" function performed by an operator of vehicle 10. Ideally, as lift arm 20 is moved between positions A an B, lift mechanism 30 is simultaneously actuated to pivot fork assembly 24 with respect to lift arm 20 such that tines 32 of fork assembly 24 remain substantially parallel to the ground. In this manner, container 12 will remain level while it is loaded and unloaded from vehicle 10. As noted above, however, with manual operation it is difficult to coordinate the movement of lift arm 20 and fork assembly 24 in a smooth and continuous fashion. In some embodiments, hoist apparatus 18 may comprise additional lift mechanisms 28 and/or 30 to enhance stability and strength. Further, in other embodiments, fork assembly 24 may rotate to facilitate dumping of a container 12.

Figure 2:
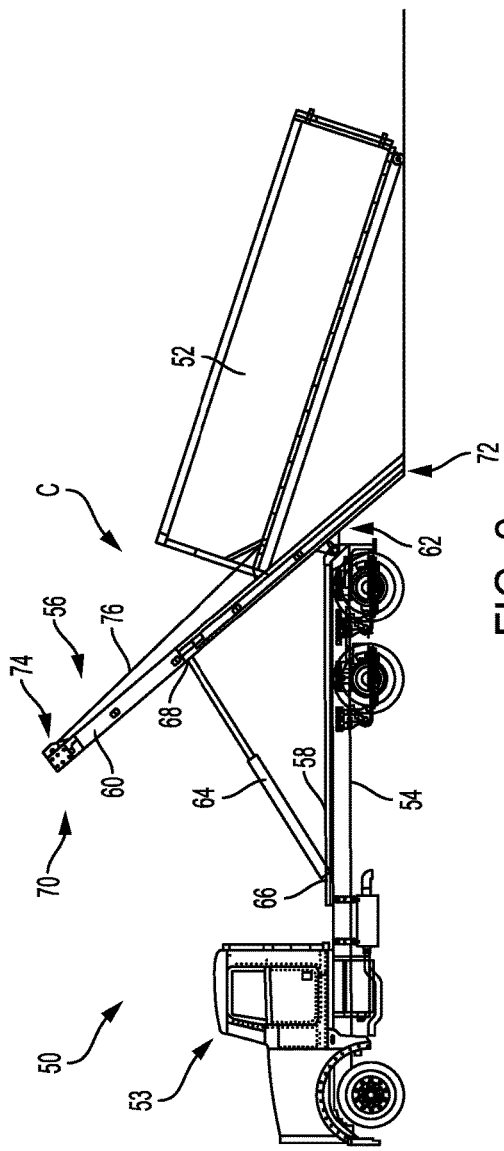
FIG. 2 is a schematic elevation of another vehicle with which an embodiment of the present invention may be utilized.

FIG. 2 is an elevation view of another vehicle 50 with which an embodiment of the present invention may be used. As shown, vehicle 50 is a roll off vehicle for transporting and dumping a container 52 and for loading and unloading container 52 from vehicle 50. In one embodiment, vehicle 50 may be analogous to the hoist vehicles offered by Galbreath LLC. In general, vehicle 50 comprises a cab 53, a vehicle chassis 54 and a hoist apparatus 56. The hoist apparatus 56 generally includes a sub-frame 58 and a main-frame 60. The sub-frame 58 of the hoist apparatus 56 is mounted to vehicle chassis 54. The main-frame 60 is pivotally mounted to the sub-frame 58 by pivotal mount 62. In other embodiments, the hoist apparatus 56 may be provided without a sub-frame 58, with the main-frame 60 being pivotally mounted directly to the vehicle chassis 54 of the vehicle 50.

Here, hoist apparatus 56 includes a pair of lift mechanisms 64, which may again be fluid actuated lift cylinders (e.g., rod-type hydraulic cylinders), which are secured at one end to the sub-frame 58 by pivotal mounts 66 and at the opposite end to the main-frame 60 by pivotal mounts 68. The lift cylinders 64 serve to elevate the main-frame 60 from a lowered, generally horizontal transporting position to a raised, inclined position C (as shown in FIG. 2) used for the loading, unloading and/or dumping of containers. When the main-frame 60 is elevated to the raised, inclined position C, the main-frame 60 pivots about pivotal mount 62 to a tilted position with a front end 70 of the main-frame 60 raised and a rear end 72 of the main-frame 60 lowered to or near the ground.

When the main-frame 60 is in the raised, inclined position C, the main-frame 60 serves as a ramp or inclined surface upon which container 52 can be slid or rolled to load the container 52 onto the hoist apparatus 56. The illustrated embodiment of hoist apparatus 56 further includes a cable winch system 74 which includes a cable 76. As shown in FIG. 2, the cable 76 of the cable winch system 74 may be connected to container 52. The cable winch system 74 operates to draw the container 52 up onto the main-frame 60 of the hoist apparatus 56 during the loading of the container 52 and to ease the container 52 down the main-frame 60 of the hoist apparatus 56 during the unloading of the container 52.

In other embodiments, vehicle 50 may comprise a tarp deployment system, for example comprising hydraulically-actuated arms that move a tarp over container 52 once it is loaded on vehicle 50. In the alternative, the tarp deployment system may comprise a hydraulically-actuated gantry that carries a tarp, from which an operator may manually pull the tarp over the load in container 52. Those of skill in the art are familiar with these and other tarp deployment systems. Additional information regarding hoist apparatuses and roll off vehicles is disclosed in U.S. Pat. No. 9,004,842 to Downing et al., the disclosure of which is incorporated by reference herein in its entirety for all purposes.

Figure 3:
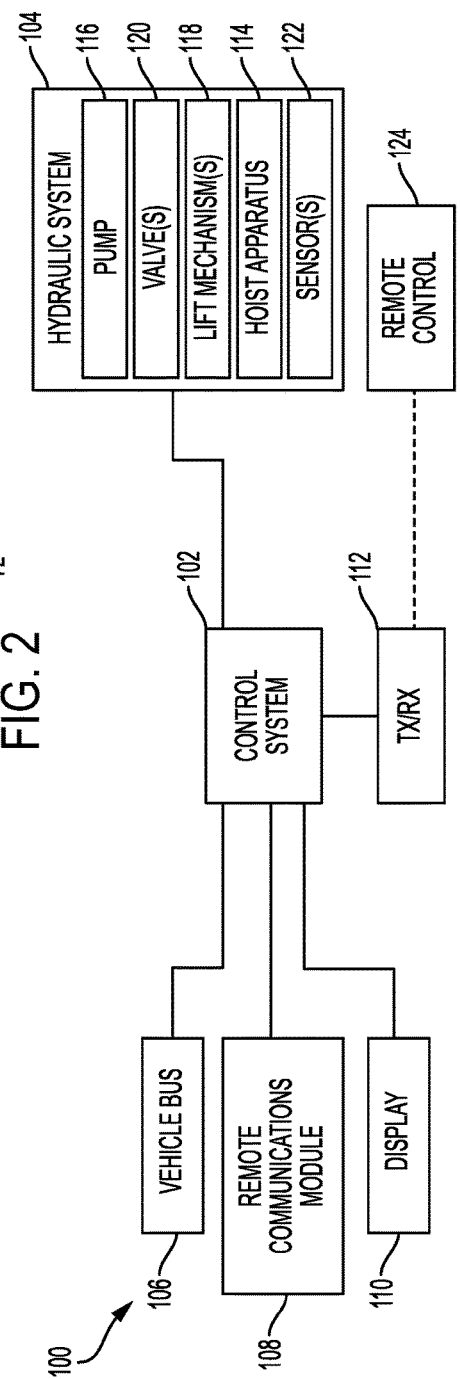
FIG. 3 is a block diagram of a system for remote, automatic operation of a vehicle hoist apparatus according to an embodiment of the present invention.

FIG. 3 is a block diagram of a system 100 for automatic operation of a vehicle hoist apparatus according to an embodiment of the present invention. For example, system 100 may be used with either of vehicles 10, 50 described above. In general, system 100 comprises a control system 102 that interfaces with various vehicle components. For example, control system 102 is in operative electronic communication with a hydraulic system 104, a vehicle bus 106, and a remote communications module 108, a display device 110. In some embodiments, system 100 may also comprise a transceiver 112 to facilitate remote, wireless operation of the vehicle hoist apparatus.

Control system 102 may be any suitable electronics with associated memory and software programs running thereon whether referred to as a processor, microprocessor, controller, control module, microcontroller, or the like. In a preferred embodiment, control system 102 may be comparable to the mobile automation control modules for hydraulic systems offered by Flodraulic Group, Inc. of Greenfield, Ind. under the trademark CANTROL™. Control system 102 preferably comprises the hardware and software necessary to operate various aspects of system 100 as described herein.

The memory of control system 102 may be any suitable memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. Control system 102 may also include a portion of memory accessible only to control system 102.

Hydraulic system 104 preferably comprises components used to actuate and control a hoist apparatus 114, such as the hoist apparatuses described above. In this regard, hydraulic system 104 may comprise a flow path along which a pump 116 (e.g., a hydraulic gear pump coupled with a shaft turned by the vehicle's engine) may pump hydraulic fluid to and from one or more lift mechanisms 118, as is well known. One or more valves 120 are preferably located along the flow path between the pump 116 and the lift mechanism(s) 118. In particular, valves 120 may be proportional valves located in a valve group coupled with the vehicle's chassis, and each valve 120 may comprise one or more spools, the movement of which controls the flow of a hydraulic fluid, such as oil, through valves 120. In a presently preferred embodiment, and in contrast to prior art air-over-hydraulic systems, valves 120 may be actuated electrically, such as by a proportional electrical actuator, by control system 102. For example, the proportional electrical actuator may comprise a solenoid. In one embodiment, valves 120 may be comparable to the model PVG 32 and PVG 100 proportional valves and actuators offered by Sauer Danfoss Company of Ames, Iowa. It will be appreciated that actuation of valves 120 occurs more rapidly via electrical signals than in response to pneumatic signals.

Figure 5:
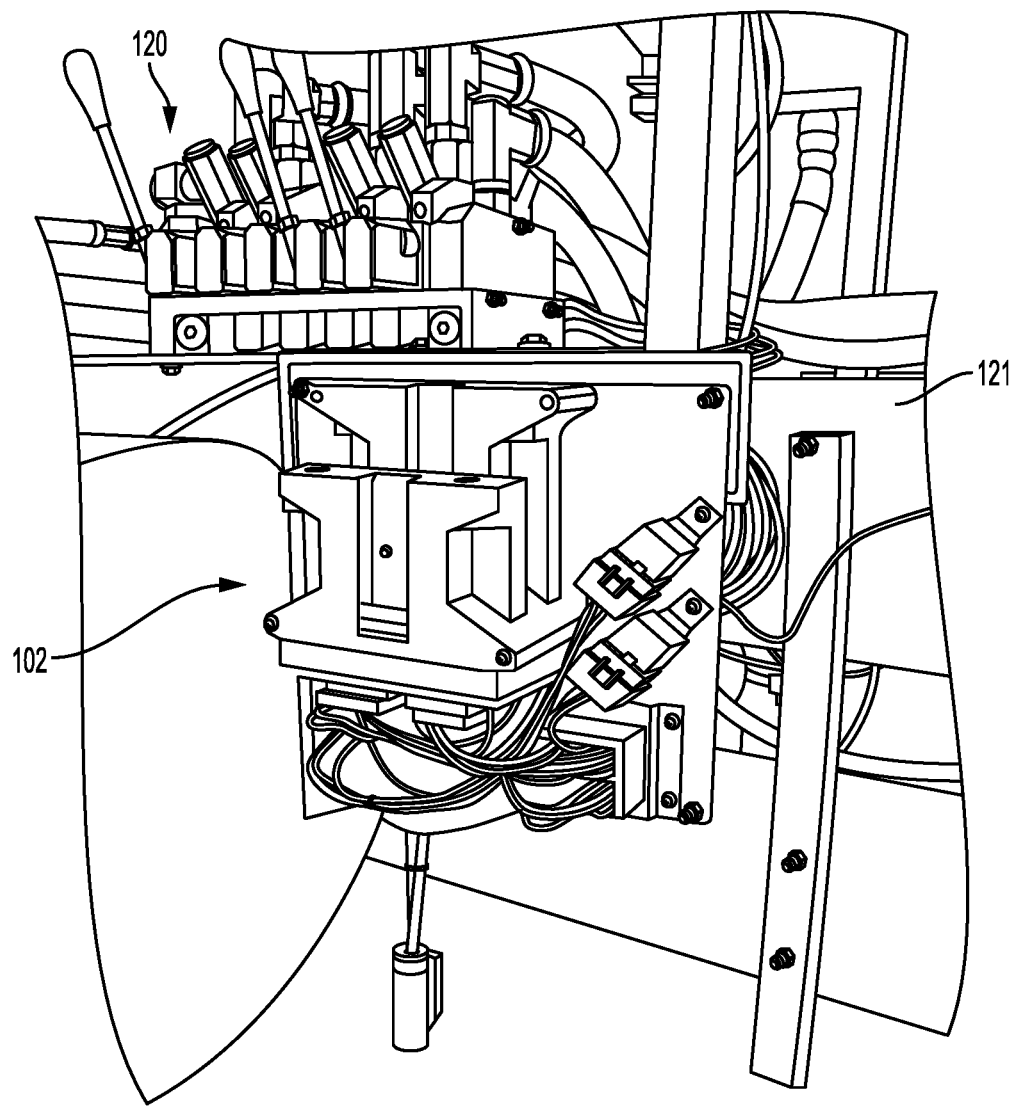
FIG. 5 is an enlarged perspective view of a control system coupled with a vehicle chassis in accordance with an embodiment of the present invention.

FIG. 5 is a perspective view of one embodiment of control system 102. Here, control system 102 is coupled with one side of a chassis 121 of a vehicle, though it will be appreciated that control system 120 may be disposed in other locations on the vehicle. As shown in FIG. 5, control system 102 is in electronic communication with five hydraulic valves 120. (In this Figure, control system 102 is shown without a cover, but it will be appreciated that control system 102 may be covered in operation.)

Returning to FIG. 3, hydraulic system 104 may further comprise one or more sensors 122 in operative electronic communication with control system 102. In this regard, sensors 122 may be position sensors operative to transmit to control system 102 information representative of the extension or retraction of lift mechanisms 118 or the movement of a component of hoist apparatus 114. In addition or in the alternative, sensors 122 may be pressure sensors that transmit to control system 102 information representative of the pressure of hydraulic fluid in lift mechanisms 118. Those of skill in the art are familiar with suitable sensors 122 for this purpose. Additional information regarding hydraulic systems and circuits for hoist apparatuses is provided in U.S. Pat. No. 8,297,904 to Schroeder; U.S. Pat. No. 6,648,576 to Duell et al.; and U.S. Pat. No. 5,088,875 to Galbreath et al. and in U.S. Pre-Grant Pub. Nos. 2009/0025378 to Laumer et al. and 2006/0285952 to Galbreath et al., the entire disclosures of each of which are incorporated by reference herein for all purposes.

Those of skill in the art are familiar with communications between electronic modules internal to vehicles, such as an engine control unit, transmission control unit, and the like. In this regard, vehicle bus 106 may comprise a communications network internal to the vehicle with which control system 102 is associated for the speedy and reliable exchange of data between vehicle components. Any suitable communications protocol may be used on bus 106, such as Controller Area Network (CAN) and Local Interconnect Network (LIN), among many others. In a preferred embodiment, the protocol may be the Society of Automotive Engineers (SAE) J1939 protocol used for commercial vehicles. Control system 102 may preferably interface with vehicle bus 106 to receive data from and communicate with the other electronic components or nodes located along vehicle bus 106.

As noted above, control system 102 may also be in electronic communication with remote communications module 108 in some embodiments. Remote communications module 108 is preferably operative to transmit diagnostic and/or telematics information regarding the vehicle with which it is associated, including health information regarding the hydraulic system, usage information, and location information. In that regard, remote communications module 108 preferably comprises a wireless radio suitable for transmitting such information to a remote computing device using any suitable communications standard, including but not limited to the IEEE 802.11, 3G, 4G, or LTE standards. Thus, an operator using the remote computing device may remotely monitor health- and usage-related information for the vehicle. Remote communications module 108 may also comprise a satellite navigation receiver or antenna operative to receive signals sent from any multiple-satellite based positioning system, such as GPS, GLONASS, and GALILEO, among others. In one preferred embodiment, remote communications module 108 may be configured to receive signals from GPS satellites, based on which module 108 may determine its precise location (e.g., in longitude and latitude or another location format) and transmit this information to a remote computing device. In one embodiment, the information communicated by and to remote communications module 108 and between remote communications module 108 and control system 102 may be similar to the information communicated in the remote monitoring system offered by the Flodraulic Group under the trademark CAN-NECT.

Figure 6:
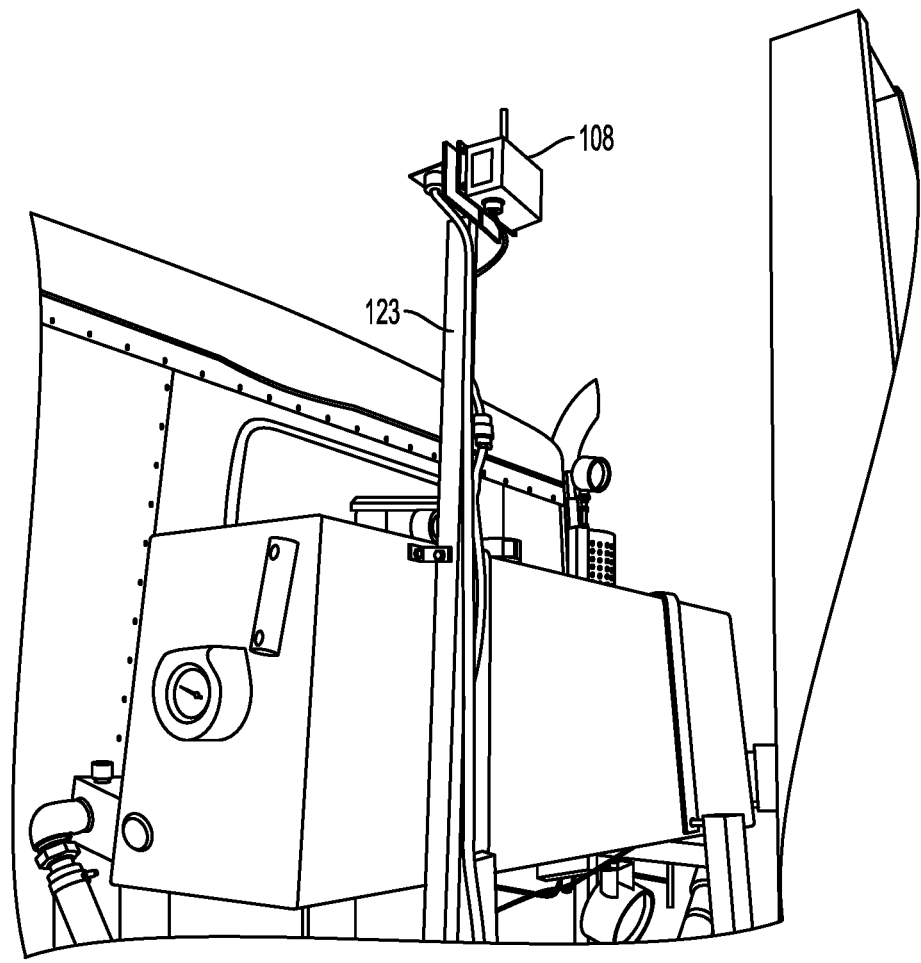
FIG. 6 is an enlarged perspective view of a GPS module coupled with a vehicle chassis in accordance with an embodiment of the present invention.

In this regard, FIG. 6 is a perspective view of a remote communications module 108 in accordance with an embodiment of the present invention. Here, remote communications module 108 is coupled with the distal end of a mast 123. As shown, mast 123 is disposed in an upright position behind the cab of a vehicle. As with control system 102, however, it will be appreciated that in other embodiments remote communications module 108 may be disposed in other suitable locations on or in the vehicle.

Figure 7:
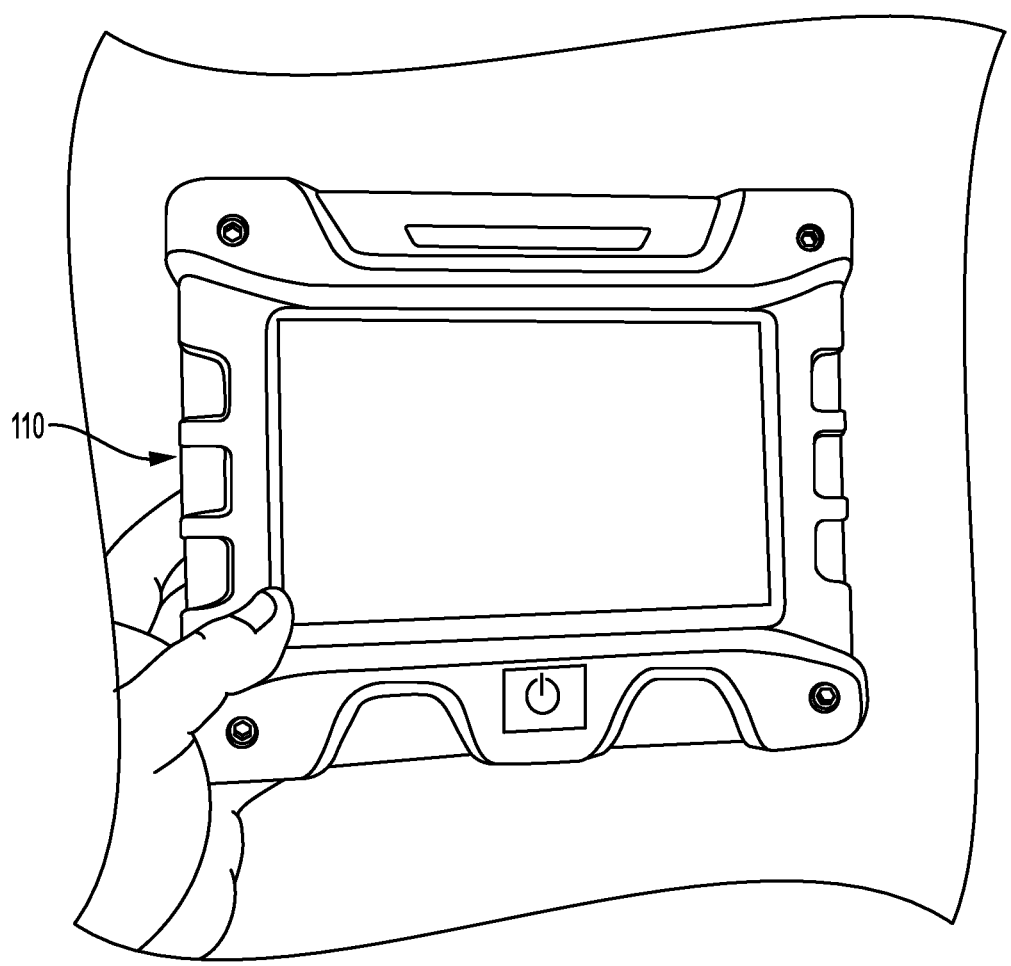
FIG. 7 is a perspective view of a display device in accordance with an embodiment of the present invention.

Display device 110 may be any suitable portable computing device known to those of skill in the art for displaying a graphical user interface, such as but not limited to computer monitors, tablet computers, laptops, and cell phones. Display device 110 is preferably in wired or wireless electronic communication with control system 102. In particular, display device 110 may comprise a processor and memory configured to generate a graphical user interface from which an operator of a vehicle may remotely control various aspects of system 100. In one embodiment, an operator may use an input device associated with display device 110 to send commands to control system 102, and in another embodiment, display device 110 may comprise a touchscreen. In any event, an operator may preferably use display device 110 to operate hoist apparatus 114 as described herein. FIG. 7 is a perspective view of a display device 110 in accordance with one embodiment of the present invention.

Referring again to FIG. 3, and as noted above, in some embodiments system 100 may comprise a transceiver 112 to enable an operator to remotely actuate the vehicle hoist apparatus. Those of skill in the art will appreciate, however, that system 100 need not comprise a remote actuation feature in all embodiments. In this regard, transceiver 112 may comprise any transceiver known to those of skill in the art that is suitable for wireless communications with a remote control unit 124. In one embodiment, transceiver 112 may comprise a wireless radio operative to communicate with remote control 124 using radio frequency signals with wavelengths in the ISM radio bands, though this is not required in all embodiments. In some embodiments, wireless communications may be implemented using a suitable short-range communications protocol, such as NFC, Bluetooth Low-Energy (also known as Bluetooth Smart), Peanut, Zigbee, Wi-Fi, or the like, though any suitable wireless communication protocol may be used with embodiments of the present invention. It will be appreciated that the permissible distance between transceiver 112 and remote control 124 will depend on the type of wireless communications used or the wireless communication standard implemented with transceiver 112 and the signal strength of the transceiver 112, among other factors. Additionally, in some embodiments, transceiver 112 may communicate with remote control 124 via infrared signals.

Figure 8:
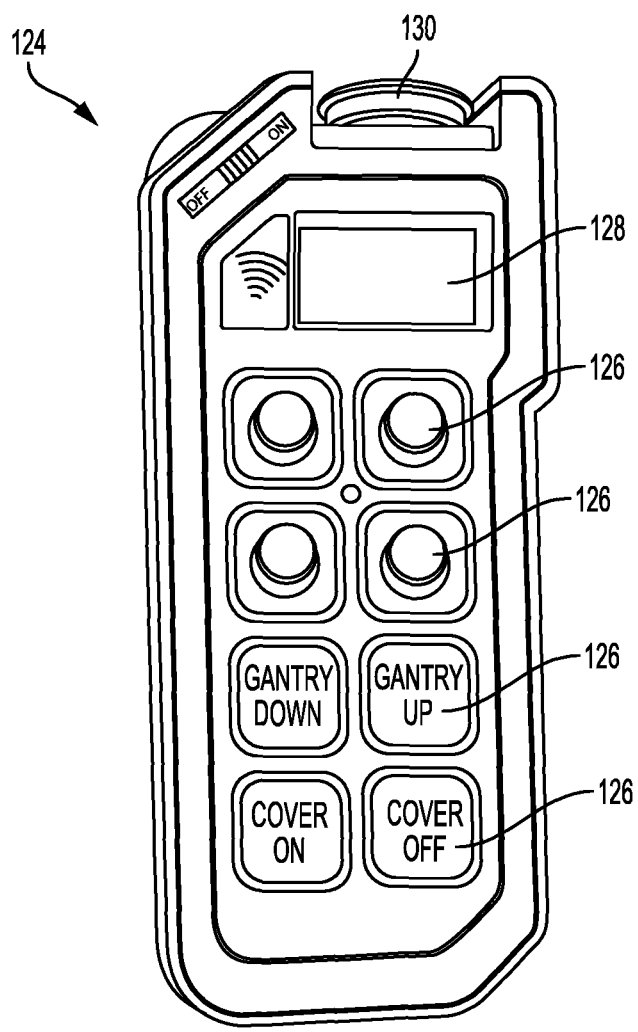
FIG. 8 is a perspective view of a remote control unit in accordance with one embodiment of the present invention.

FIG. 8 is a perspective view of a remote control 124 in accordance with one embodiment of the present invention. As shown, remote control 124 may preferably be a portable, handheld device configured for wireless communication with transceiver 112 as described above. In the illustrated embodiment, remote control 124 comprises eight buttons 126 on a front surface thereof along with a display 128, which may be an LCD or LED display, for example. As needed or desired, remote control 124 may also comprise one or more buttons 126 on either side thereof. Finally, as shown, remote control 124 comprises a button 130 on a top surface thereof.

It will be appreciated that the number, configuration, and function of buttons 126, 130 on remote control 124 may vary, depending on the needs of the operator and the type of hoist apparatus to be controlled. In the illustrated embodiment, for example, remote control 124 may be associated with a roll off-type hoist vehicle, and thus buttons 126 on the front surface may correspond to the following functions: "hoist up"; "hoist down"; "winch out"; "winch in"; "gantry down"; "gantry up"; "cover on"; "cover off." In other embodiments where remote control 124 is used with a system 100 associated with a loaded container handling vehicle, buttons 126 may correspond to other functions, such as "hoist up," "hoist down," "tilt up," "tilt down," "rotate curb," and "rotate street." In still other embodiments, buttons 126 may correspond to operation of a hydraulic tarping system or to actuation of work lights on a vehicle. Those of skill in the art are familiar with these functions when performed manually by an operator of a prior art roll off vehicle or loaded container handler.

In a preferred embodiment, at least two of buttons 126 may be used for automatic loading and unloading of a container. Thus, for example, one button 126 may correspond to an "auto load" function, and another may correspond to an "auto unload" function. The operation of these functions is described in greater detail below. In addition, button 130 may correspond to an "emergency stop" function described in more detail below.

When a user actuates one of buttons 126, remote control 124 may send a signal to control system 102 (via transceiver 112) indicating that the function associated with the button should occur. Control system 102 may then actuate one or more valves 120 and/or pump 116 to cause that function to occur. In some embodiments, the length of time a function occurs may correspond to the length of time an operator depresses one of buttons 126. When the control system 102 no longer receives a signal from remote control 124, control system 102 will stop performance of the requested function. In other embodiments, after the operator has depressed a particular button 126, control system 102 may cause the corresponding function to occur continuously, and regardless of whether the operator is still depressing the button 126, until the function is complete or until the operator depresses the same button 126 for a second time. Further, in some embodiments, when a button 126 is depressed, further presses of the same button 126 may adjust the speed at which the function activated by that button occurs. For example, in the case of "auto load" or "auto unload" functions, successive pressing on these buttons may cause the speed of actuation of hoist apparatus 114 to increase a predetermined amount, up to a maximum speed. Those of skill in the art will appreciate, however, that buttons 126 may be configured for different or additional functionality in other embodiments.

Figure 4A:
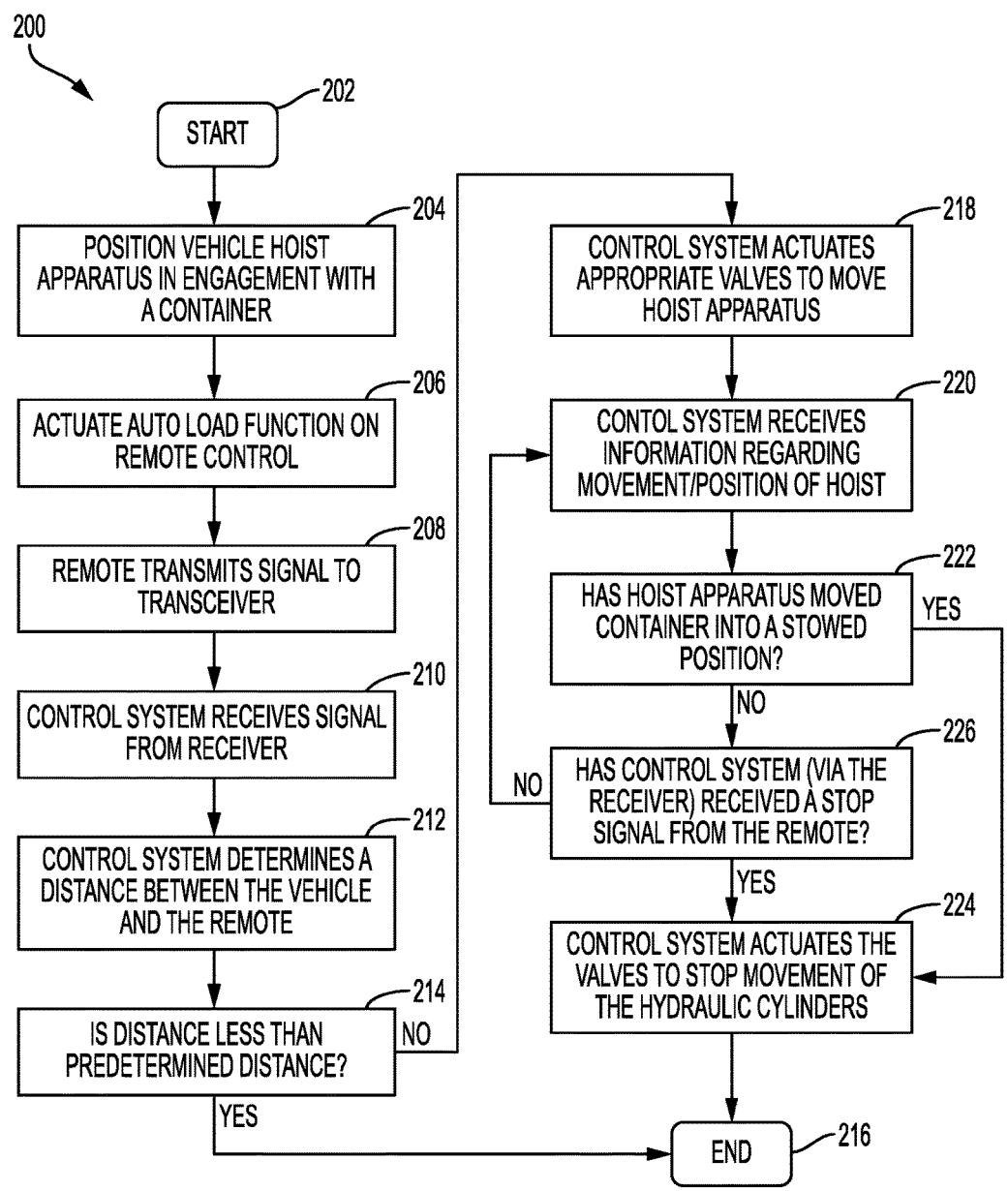
FIG. 4A is a flow diagram illustrating steps of a method of automatically loading a container onto a vehicle in accordance with an embodiment of the present invention.

FIG. 4A is a flow diagram illustrating steps of a method 200 of automatically loading a container onto a vehicle in accordance with an embodiment of the present invention. In the following description, the vehicle is a loaded container handler analogous to vehicle 10, described above, but those of skill in the art will be able to practice the applicable steps of method 200 with respect to other vehicles, including roll off hoist vehicles. In addition, while the method discussed relates to automatically loading a container onto a vehicle, those of skill in the art will be able to practice the applicable steps of method 200 to perform other vehicle functions that may be automated, such as rotating and dumping a container or covering or uncovering a container with a tarp, among others.

At step 202, the process begins, and at step 204, the hoist apparatus of a vehicle is positioned in engagement with a container to be loaded onto the vehicle. With respect to vehicle 10, for example, tines 32 of hoist apparatus 18 may be received in corresponding slots on either side of container 12, as shown in position B of FIG. 1. At step 206, an operator of vehicle 10 may actuate the "auto load" function on a remote control, such as by pressing a corresponding button 126 on remote control 124. (In an alternative embodiment, as noted above, the system need not be actuated via a remote, and the operator may instead actuate the "auto load" function using another device, such as display 110 or controls located in the cab of the vehicle.) The remote then transmits to a transceiver a signal carrying information representative of the request that automatic loading of the container occur (step 208). The transceiver then passes this information to the system control system (step 210).

Although not required in all embodiments, in this embodiment, method 200 may comprise an interlock feature to ensure operator safety during automatic operation of the hoist apparatus. In particular, based on information received from the transceiver, the control system may determine a distance between the transceiver and the remote (step 212). The control system may use this as an estimate of the distance of the operator from the vehicle. Those of skill in the art will appreciate that the ability of the control system to perform this distance measurement, and the accuracy of the measurement, may depend on the wireless communications protocol used between the remote control and the transceiver. Wireless communication protocols suitable for this purpose, noted above, are familiar to those of skill in the art. At step 214, the control system may compare the measured distance to a predetermined distance, for example stored in memory. The predetermined distance may vary depending on the type of vehicle, container, and/or hoist apparatus being used, but may be, for example, approximately 3 to 5 feet. In any event, if the measured distance is less than the predetermined distance, the control system will prevent actuation of the hoist apparatus or automated loading of the container, and the process will end (step 216). In other words, if the operator is determined to be too close to the hoist apparatus, the automatic load function will not execute.

If, however, the remote control is sufficiently far from the transceiver, the control system will cause movement of the hoist apparatus to automatically load the container. In particular, at step 218, the control system may electronically actuate the valve(s) to allow hydraulic fluid to flow to and from particular lift mechanisms of the hoist apparatus. As explained above, for example, the control system may communicate with solenoid actuators to cause proportional movement of valve spools. Notably, in embodiments of the present invention, the control system may control the movement of valve spools in multiple valves simultaneously. Thus, the control system may cause movement of the hoist apparatus in a smooth, continuous, and precise fashion. In the case of vehicle 10, by simultaneous electronic actuation of multiple valves that control lift mechanisms 28 and 30, the control system may cause the lift arm 20 and fork assembly 24 to move together with respect to one another as shown in FIG. 1, in the process moving hoist apparatus 18 from position B to position A.

During movement of the hoist apparatus, the control system may receive information regarding the relative movement and/or position of the hoist apparatus (step 220). As noted above, for instance, the control system may receive this information from pressure and/or position sensors located in the system. At step 222, the control system determines whether the automatic load cycle is complete, i.e., whether the container has been loaded onto the vehicle, or in the specific case of vehicle 10, whether hoist apparatus 18 has moved from position B to position A of FIG. 1. If the cycle is complete, at step 224, the control system may actuate the valves to stop movement of the hydraulic cylinders, and the process again ends (step 216).

If it is not complete, at step 226 the control system may check for receipt of a signal from the remote control indicating that the process should stop. As explained above, in various embodiments this signal may take various forms, including the absence of a continuous signal from the remote control (indicating that an operator has taken his or her finger off of the auto load button) or a specific "stop" signal. Indeed, in one embodiment noted above, the system may comprise an emergency stop feature. With reference to FIG. 8, if an operator actuates button 130, remote control 124 may send an emergency stop signal to transceiver 112, and upon receipt control system 102 will then immediately cause appropriate hydraulic valves to close so that movement of all lift mechanisms is stopped. If the control system has received any type of stop signal, method 200 proceeds to step 224, described above, after which the process again ends (step 216). If not, the process returns to step 220, and the control system continues to monitor movement of the hoist apparatus.

Figure 4B:
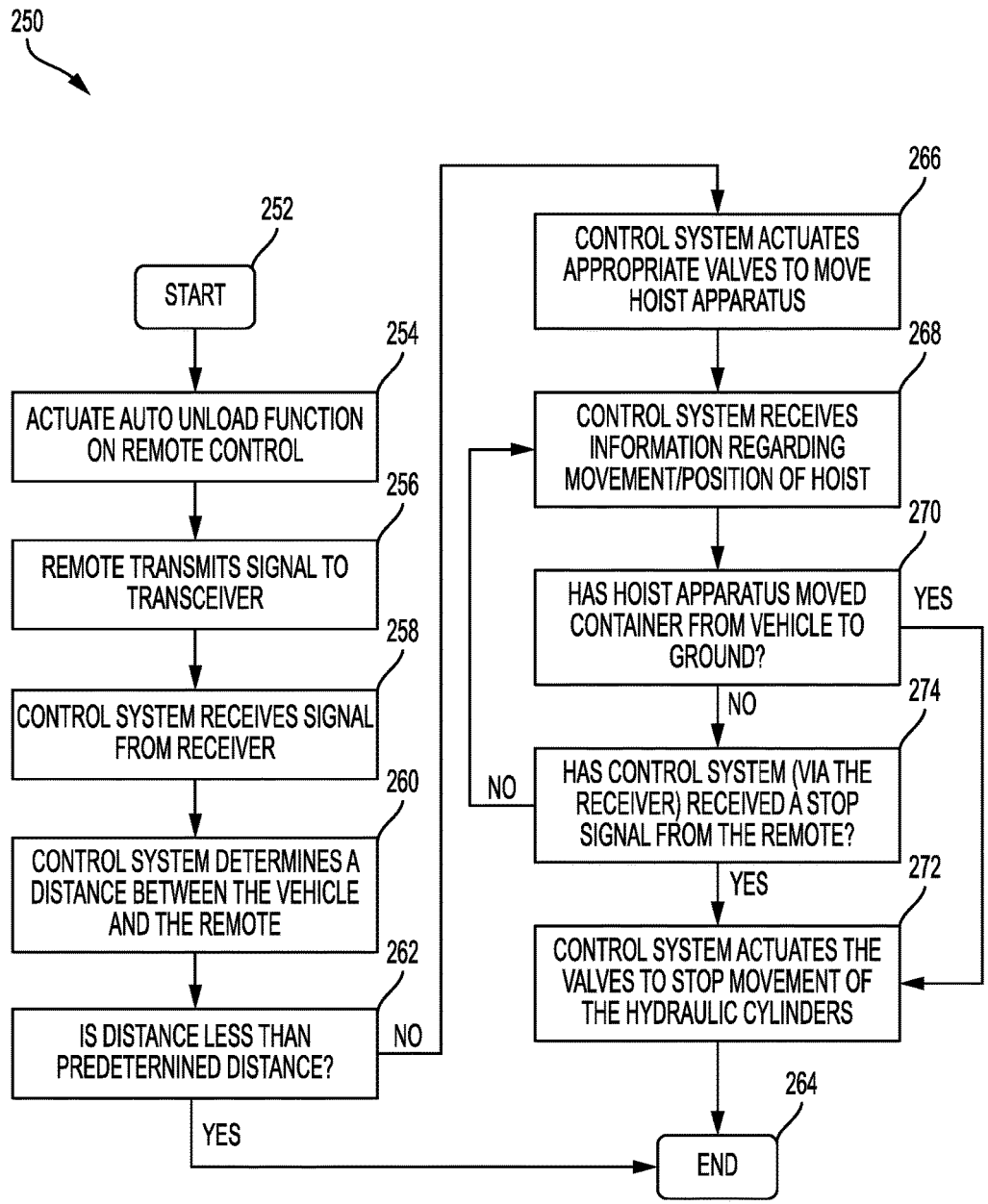
FIG. 4B is a flow diagram illustrating steps of a method of automatically unloading a container from a vehicle in accordance with an embodiment of the present invention.

FIG. 4B is a flow diagram illustrating steps of a method 250 of automatically unloading a container from a vehicle in accordance with an embodiment of the present invention. Method 250 is, in general, the reverse of method 200, and thus only a brief discussion is provided. With method 240, the vehicle is again a loaded container handler analogous to vehicle 10.

At step 252, the process begins, and at step 254, an operator of vehicle 10 may actuate the "auto unload" function on a remote control, such as by pressing a corresponding button 126 on remote control 124. The remote then transmits to a transceiver a signal carrying information representative of the request that automatic unloading of the container occur (step 256). The transceiver then passes this information to the system control system (step 258).

Again, if the interlock feature is present, based on information received from the transceiver, the control system may determine a distance between the transceiver and the remote (step 260). At step 262, the control system may compare the measured distance to a predetermined distance, for example stored in memory. If the measured distance is less than the predetermined distance, the control system will prevent actuation of the hoist apparatus or automated unloading of the container, and the process will end (step 264). If, however, the remote control is sufficiently far from the transceiver, the control system will cause movement of the hoist apparatus to automatically unload the container. In particular, at step 266, the control system may electronically actuate the valve(s) to allow hydraulic fluid to flow to and from particular lift mechanisms of the hoist apparatus. In the case of vehicle 10, by simultaneous electronic actuation of multiple valves that control lift mechanisms 28 and 30, the control system may cause the lift arm 20 and fork assembly 24 to move together with respect to one another as shown in FIG. 1, in the process moving hoist apparatus 18 from position A to position B.

During movement of the hoist apparatus, the control system will again receive information regarding the relative movement and/or position of the hoist apparatus (step 268). At step 270, the control system determines whether the automatic unload cycle is complete, i.e., whether the container has been unloaded from the vehicle, or in the specific case of vehicle 10, whether hoist apparatus 18 has moved from position A to position B of FIG. 1. If the cycle is complete, at step 272, the control system may actuate the valves to stop movement of the hydraulic cylinders, and the process again ends (step 264). If it is not complete, at step 274 the control system may check for receipt of a signal from the remote control indicating that the process should stop. If the control system has received any type of stop signal, method 250 proceeds to step 272, described above, after which the process again ends (step 264). If not, the process returns to step 268, and the control system continues to monitor movement of the hoist apparatus.

Based on the above, it will be appreciated that embodiments of the invention provide a unique system for automatic control of a hoist apparatus on a vehicle. In embodiments of the present invention, a control system may actuate multiple hydraulic valves in unison to provide smooth, continuous, and precise movement of a hoist apparatus. This may both improve the speed at which containers can be loaded and unloaded from roll of vehicles and loaded container handlers and increase the safety of doing so. Further, some embodiments of the present invention provide for remote actuation of the hoist apparatus.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method of operation for a control system associated with a vehicle, the vehicle comprising a hydraulic system in electronic communication with the control system, the control system performing the steps of:
   receiving an initiation signal from a remote control unit;
   in response to the initiation signal, selectively electronically actuating first and second valves in fluid communication with first and second lifting mechanisms along a fluid flow path, the first and second lifting mechanisms operative to move a hoist apparatus coupled with the vehicle between a first position and a second position in response to movement of hydraulic fluid;
   controlling the flow of hydraulic fluid along the fluid flow path to move the hoist apparatus from the first position;
   receiving information representative of the movement of the hoist apparatus; and
   when the hoist apparatus is in the second position, actuating the first and second valves to stop movement of the first and second lifting mechanisms.

2. The method of claim 1, wherein the control system is in electronic communication with a radio frequency transmitter and a radio frequency receiver.

3. The method of claim 2, wherein the initiation signal is received at the radio frequency receiver from a remote control and transmitted to the control system.

4. The method of claim 2, further comprising the step of determining a distance between the vehicle and the remote control unit.

5. The method of claim 4, further comprising the step of comparing the distance with a predetermined distance prior to electronically actuating the first and second valves.

6. The method of claim 1, wherein the information representative of the movement of the first and second lifting mechanisms is transmitted from position sensors associated with the first and second lifting mechanisms.

7. The method of claim 1, further comprising receiving location information from a GPS module in electronic communication with the control system.

8. The method of claim 1, further comprising the step of receiving diagnostic information regarding the vehicle via a vehicle bus in electronic communication with the control system.

9. A vehicle comprising:
   a chassis and a hoist apparatus coupled with the chassis;
   at least one lift mechanism operative to move the hoist apparatus with respect to the chassis in response to the flow of hydraulic fluid along a fluid flow path;

at least one valve in fluid communication with the at least one lift mechanism;

a control system in electronic communication with the at least one valve;

a transceiver in electronic communication with the control system;

the control system operative to receive, via the transceiver, an initiation signal from a remote control unit;

the control system operative to selectively actuate the at least one valve in response to the initiation signal to move the hoist apparatus from a first position to a second position.

10. The vehicle of claim 9, wherein the control system is operative to automatically load a container onto and unload a container from the vehicle by selective actuation of the at least one valve.

11. The vehicle of claim 9, wherein the at least one valve comprises a plurality of valves.

12. The vehicle of claim 11, wherein the plurality of valves are electrically actuated.

13. The vehicle of claim 11, wherein the at least one lift mechanism comprises a plurality of lift mechanisms.

14. The vehicle of claim 9, wherein the control system is in electronic communication with at least one display.

15. The vehicle of claim 9, wherein the control system is in electronic communication with a vehicle bus.

16. The vehicle of claim 15, further comprising a GPS module in electronic communication with the control system.

17. The vehicle of claim 16, wherein the control system is operative to transmit, via the GPS module, diagnostic data received via the vehicle bus to a remote computer.

18. The vehicle of claim 9, wherein the vehicle is a roll-off vehicle.

19. The vehicle of claim 9, wherein the control system is operative to determine a distance between the remote control unit and the vehicle.

20. The vehicle of claim 19, wherein the control system will not actuate the at least one valve in response to the initiation signal if the distance is less than a predetermined distance.

* * * * *